United States Patent Office 2,696,065
Patented Dec. 7, 1954

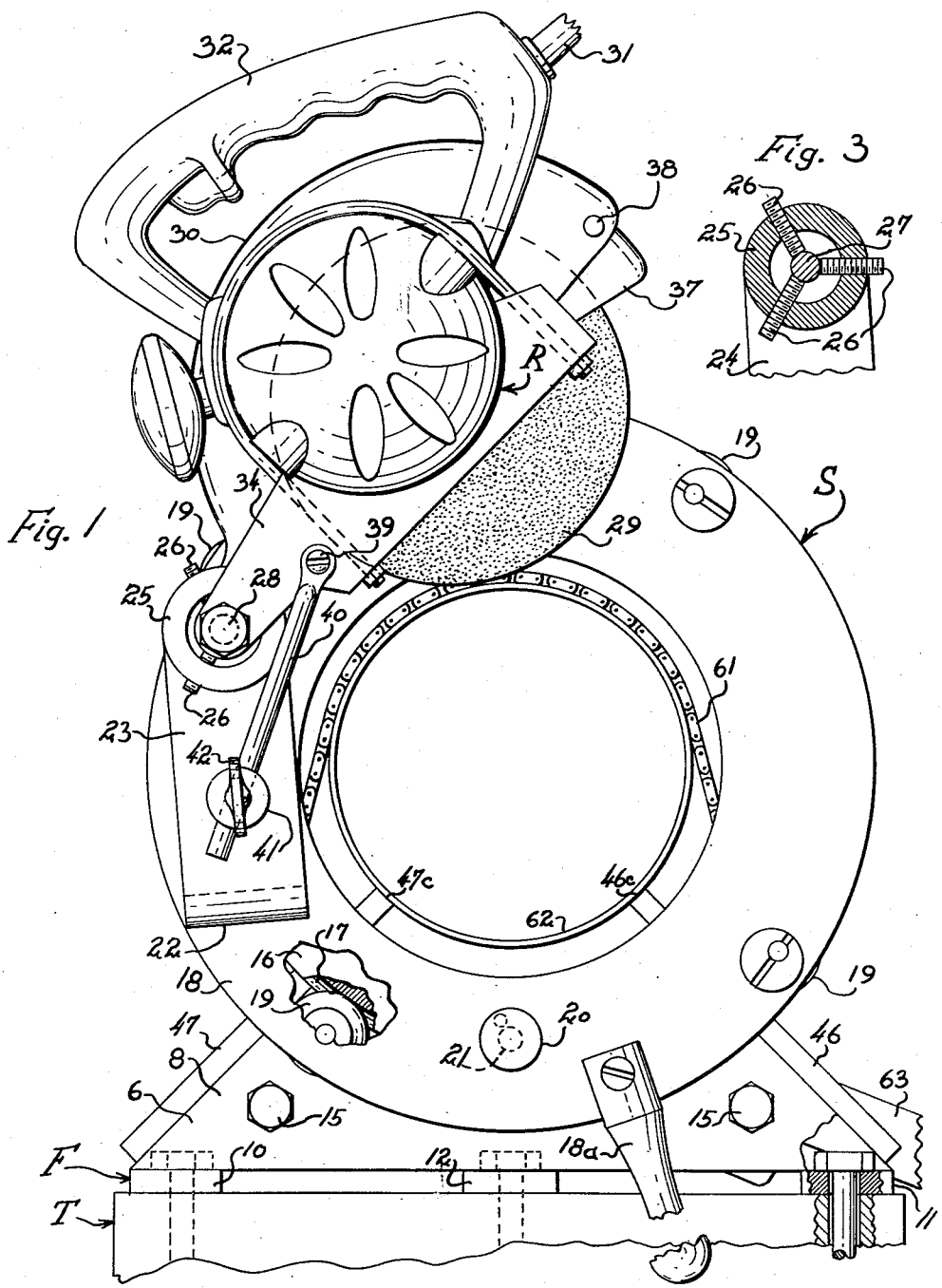

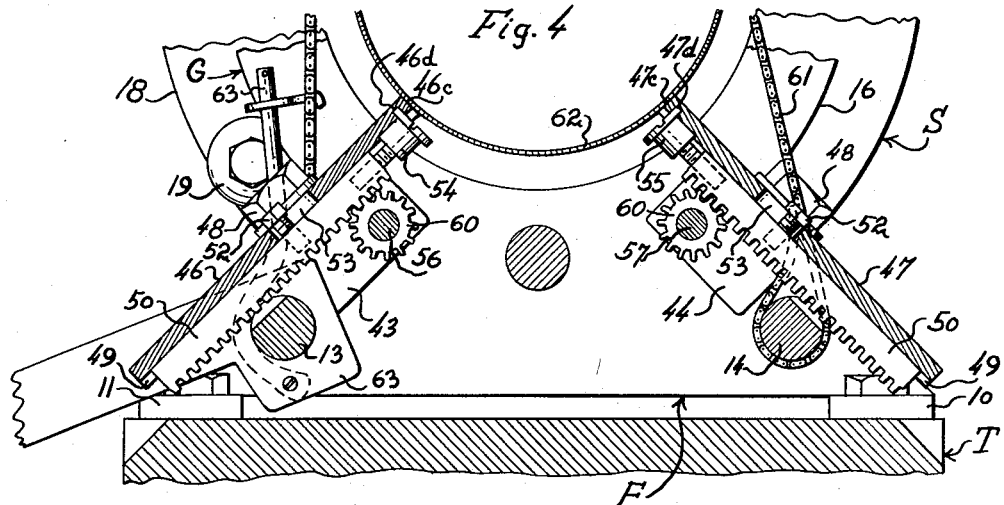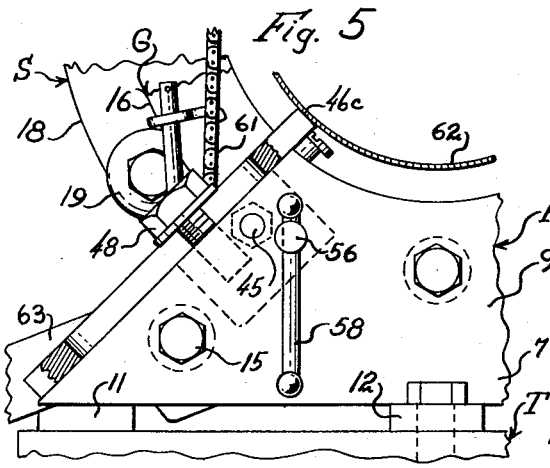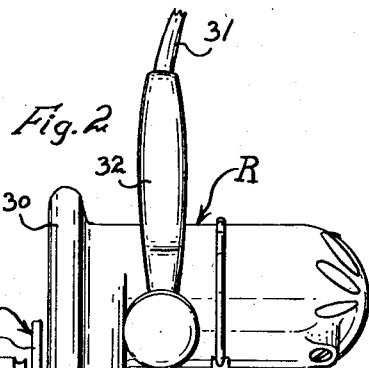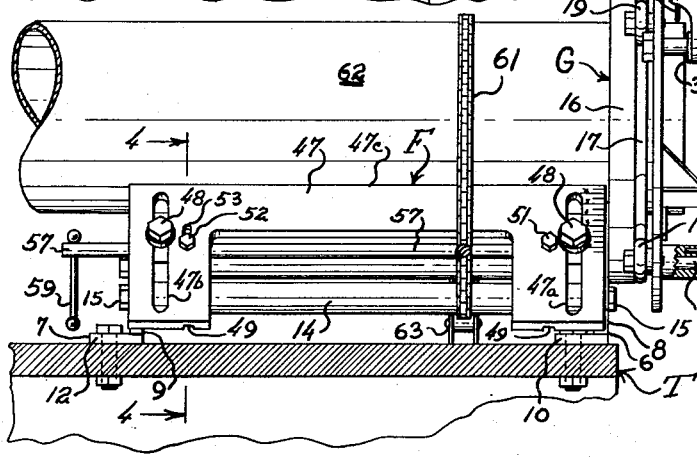

2,696,065

PIPE CUTTER

Oren B. Harmes, Algona, Iowa, assignor to Livingston Tool Co., Algona, Iowa, a partnership Application October 31, 1952, Serial No. 317,885

5 Claims. (Cl. 51—90)

This invention relates to devices for cutting pipes, shafts and the like. More particularly, it relates to devices for cutting off such members at an angle normal to the length of the same with precision accuracy.

This invention is an improvement over my prior invention as disclosed and claimed in application for United States Letters Patent, Serial No. 253,487 filed by me on October 27, 1951 and entitled "Pipe Cutter." While the pipe cutter disclosed and claimed in that application operates efficiently and has proved highly satisfactory for most such cutting operations, it is often times required that pipes and the like be cut normal to their length with precision accuracy. All other pipe cutters previously known to me have been not only inefficient but incapable of producing a cut of precision accuracy normal to the length of the member to be cut. My invention is directed toward providing such a device.

It is a general object of my invention to provide a novel and improved pipe cutter constructed to insure that the cut made thereby is normal to the length of the piece of work being cut with precision accuracy.

A more specific object is to provide a novel and improved pipe cutter of cheap and simple construction and operation and having increased efficiency in preparing a cut exactly normal to the length of the piece of work.

Another object is to provide a novel and improved pipe cutter capable of being adjusted to receive pipes of various known diameters and holding the same truly normal to the cutting element to insure a cut exactly normal to the length of the pipe.

Another object is to provide a novel pipe cutter capable of efficiently cutting pipes of various diameters truly normal to their length and of being readily and easily adjusted back into true position in the event, for one reason or another, it leaves such position.

Another object is to provide a novel and improved pipe cutter which will quickly, easily and most efficiently make a cut on a pipe which is truly normal to the length of the piece of pipe.

Another object is to provide a novel and improved pipe cutter which can cut pipes of various known diameters over a relatively wide scale without the device having dimensions which are impractical, the largest possible diameter of the pipe being substantially equal to the diameter of the guideway about which the rotary cutting tool moves.

These and other objects and advantages of my invention will more fully appear from the following description made in connection with the accompanying drawings, wherein like reference characters refer to the same or similar parts throughout the several views, and in which:

Fig. 1 is a front elevational view of one embodiment of my invention with a piece of pipe held therein and the device being in ready-to-cut position;

Fig. 2 is a side elevational view of the same;

Fig. 3 is a sectional view taken along line 3—3 of Fig. 2;

Fig. 4 is a sectional view taken along line 4—4 of Fig. 2; and

Fig. 5 is a segmental rear end elevational view with portions thereof cut away to more clearly show the structure.

One embodiment of my invention is shown in Figs. 1–5 mounted upon a table or bench indicated generally as T and including a frame indicated generally as F. As shown, this frame may have a forward end 6 and a rearward end 7 and may include a pair of longitudinally spaced leg members 8 and 9. The leg member 8 has a pair of feet 10 and 11 adjacent opposite end portions thereof and the leg 9 has a single foot 12 extending downwardly and outwardly from the central portion thereof. A pair of shafts 13 and 14 extend between these legs 8 and 9 connecting the two and extending through each at their reduced end portions which are threaded and carry cap screws such as 15 to secure the same.

Mounted on the frame F and extending upwardly therefrom is a guideway indicated generally as G and being comprised of a metal ring 16 having a track 17 formed around the outer circumferential surface thereof.

Mounted on the guideway G in its track 17 is a tool support S which also is comprised of a metal ring 18 having rollers 19 secured thereto and engaging the track 17 of the guideway. In this manner the tool support S is revolvably mounted upon the guideway G so that it may turn relative thereto and move along the length of the guideway. This tool support S is provided with a lock pin 20 the locking elements 21 of which extend through the tool support S and engage the guideway G in apertures (not shown) provided therefor. It is also provided with an outwardly and radially extending handle 18a as best shown in Fig. 1.

Mounted on the tool support S and extending outwardly therefrom is a bracket B having an outwardly extending portion 22 and a vertically extending portion 23 which extends parallel to the tool support S. The free end 24 of this bracket B has an aperture formed therethrough and supports a metal ring 25 which has a plurality of set screws 26 extending therethrough and toward each other adjacent the center of the ring. This can best be seen in Fig. 3 wherein the set screws 26 are shown engaging the shank which extends through the ring. This shaft 27 is mounted upon the tool support S, as best shown in Fig. 2, and extends outwardly and normally therefrom through the apertures in the free end portion 24 of the bracket B and through the ring 25. This shaft 27 extends through the aperture in the free end portion 24 in loose-fitting relation and its position relative thereto is determined by the adjustment of the set screws 26. A nut 28 is secured to the outer and free end of the shank 27.

Pivotally mounted upon the shaft 27 is a rotary cutter tool indicated generally as R having an abrasive disc 29 rotatably mounted therein and driven by a motor (not shown) which is encased by a housing 30. An electric cord 31 carries the current to the motor which drives the abrasive disc. A handle 32 is secured to the upper portion of the housing 30 and a pair of pivot ears 33 and 34 provide the pivotal mounting for the tool R as best shown in Fig. 2, the tool pivoting upon the shaft 27. The pivot ear 33 is formed integrally with the housing 30 and is comprised of a laterally extending apertured portion as best seen in Figure 2. The pivot ear 34 is an apertured part of a plate member secured to the housing 30, as best shown in Figure 3. The tool R is prevented from moving longitudinally of the shaft 27 by a pair of stop washers 35 and 36 which are positioned at opposite sides of the pivot ear 33.

As best shown in Fig. 1, the housing 30 of the rotary cutter tool R also carries a guard member 37 which is slidable therewithin in telescoping relation and extendible to whatever length desired to provide a guard for the abrasive disc 29 during the cutting operation. This guard can be set in the desired position relative to the housing 30 by means of a set screw 38.

Pivotally mounted upon the pivot ear 34 as at 39 is a rod 40 which extends downwardly through a head 41 which is fixedly secured to the vertical portion 23 of the bracket B. A set screw 42 is utilized to lock the rod 40 from sliding movement relative to the head when the same is desired.

Mounted upon the end plate 8 at the front end of the frame F and the opposite sides thereof is a pair of journals 43 and 44. These journals 43 and 44 are secured to the end plate by bolts such as 45 as shown in Fig. 5, the other journal not being shown in that view. Secured to the other end plate 9 in corresponding positions and in a similar manner is another pair of journals (not shown). Mounted upon these journals in sliding relation thereto is a pair of support plates 46 and 47 which extend upwardly and inwardly toward each other. Each of these support plates has a pair of transverse slots such as 47a and 47b as best shown in Fig. 2 and each is secured to its respective journals by bolts 48 which pass inwardly through the slots and into the respective journals to permit the same support plates to slide relative to the journals upwardly and inwardly toward each other in the plane in which they extend. Each of the support plates 46 and 47 has a keyway such as 49 formed in its undersurface at its forward and rearward end portions as best shown in Fig. 2. Each of these keyways 49 carries a key member such as 50 shown best in Fig. 4, one side of this key member having teeth 50a formed therein and extending downwardly therefrom. Each of the keys 50 at the forward end of the support plates 46 and 47 is fixedly secured in the keyway to the support plates by a screw such as 51. Each of the keys 50 in the keyways 49 at the rear end portions of the support plates 46 and 47 is secured to its support plate by a screw 52 which extends through a slot such as 53. The key 50 is in this manner made adjustable relative to the keyway and the support plate at the rear end portion of the support plate in contrast to the key at the forward end portion thereof. Each of the support plates 46 and 47 has an elongated supporting surface 46c and 47c. Formed in the support plates 46 and 47 is a slit 46d and 47d adjacent the rear end portions thereof, this slit being adapted to accommodate a screw member 54 or 55. The screw members are threaded into the upper ends of the keys 50 at the rear end of the supporting plates 46 and 47 as best shown in Fig. 4.

Extending between the journals on each side of the frame F and longitudinally of the support plates 46 and 47 is a pair of shafts 56 and 57 each of these shafts having a handle such as 58 or 59 at its rearward end. Mounted on each of the shafts 56 and 57 is a gear such as 60 which is positioned to cooperate with the teeth of each of the respective keys 50 so that when the shaft is turned the key 50 will be caused to move upwardly and downwardly relative thereto.

Secured to the shaft 14 is a chain 61 which is adapted to extend upwardly and over the pipe 62 to the other side of the frame where it is engaged by an over-dead-center tightening device 63. In this manner the pipe is held in the desired position relative to the supporting plates 46 and 47 during the cutting operation.

In use, the device is first secured by the feet 10, 11 and 12 to the table or bench T. In so doing, the supporting plates 46 and 47 are frequently distorted relative to the rotary cutting tool R so that a true cut would not result if the supporting plates were not first adjusted. To insure that a cut truly normal to the length of the piece of work or pipe to be cut is obtained, the rotary cutting tool is lowered so as to be opposite the open area of the guideway G and the tool support S and a plurality of tapped reference shafts (not shown) of various known diameters and with truly normal end surfaces are secured one at a time to the power shaft of the disc 29 so that the shaft will rotate. The support plates 46 and 47 are then adjusted so that the rotating shaft will touch them along its entire length and the support plates are then marked accordingly opposite the inner circumferential surface of the metal ring 16. In this manner the support plates 46 and 47 may be scaled as shown in Fig. 2 so that thereafter in use, the operator need only adjust the support plates in accordance with the scale to insure that the piece of work to be cut will have its center on the center of the cutting tool if the cutting tool were moved to its central position relative to the support S. In other words, if a six inch pipe is to be cut, the gears would be adjusted by turning the handles 58 and 59 thereby causing the keys 50 to carry the support plates to the desired position. At this point the piece of work to be cut would be in the optimum position for insuring a cut truly normal to the length of the piece of work. If adjustment is needed longitudinally of the support plates 46 and 47, this is accomplished by adjustment of the screws 54 and 55 to cause the end portions of the support plates 46 and 47 to raise or lower as desired. By turning of these screws the keys 50 can be drawn upwardly or downwardly relative to the support plate. These screws are valuable for any subsequent adjustment which may have to be made.

If after operation, it appears that the machine has become slightly out of alignment, careful adjustments may be made of the mounting of the rotary cutter element R by adjustment of the set screws 26 in the ring 25. By adjustment of these set screws a quarter turn at a time the axis of pivot of the rotary cutter element may be adjusted as required so that the operator may at all times be assured of a cut truly normal to the length of the piece of pipe.

In use, the support plates 46 and 47 are adjusted as indicated on the scale to the required position for the piece of work to be cut. If it is a three-inch pipe they are adjusted so that the numeral 3 on the scale is opposite the inner circumferential surface of the metal ring 16 and then the pipe is placed upon the supporting surface of these support plates and extending through the guideway G and the tool support S the desired distance. The chain 61 is then passed over the piece of pipe 62 and made secure by the over-dead-center tightening device 63. Prior to this time, of course, the rotary cutter tool R with its disc 29 has been swung to an out-of-way position, the set screw 42 being loosened. To commence the cut the support S is locked relative to the guideway G by securement of the lock pin 20 and the cutter tool R is swung into cutting position by the worker bringing the disc 29 into such position as shown in Fig. 1. When the disc has cut through the piece of pipe, the set screw 42 is tightened so as to secure the rod 40 against movement relative to the head 41 and the lock pin 20 is drawn outwardly to free the same. Thereafter the entire rotary cutting tool is swung or revolved around the pipe, the tool support S moving around the guideway G until a complete circle has been described. The abrasive disc 29 cuts the pipe during this revolution so that the cut is truly normal to the length of the piece of pipe. It is possible with this pipe cutter to cut such a piece of pipe within .005 of an inch tolerance on a 12 inch pipe.

When the cut has been completed the set screw 42 is released and the rotary cutter tool R is swung outwardly to a position so that the abrasive disc 29 lies outward of the pipe 62 and a new length may be cut from the pipe or a pipe of a different or the same diameter may be inserted into the device for a new cut. If the pipe is of a different diameter the device may be readily adjusted to accommodate the same by adjusting the relative positions of the support plates 46 and 47. This can be done quickly and easily and with assurance that the resulting cut will be truly normal to the length of the pipe.

It should be noted that it is possible for this device to accommodate a piece of pipe substantially equal to the diameter of the open area within the guideway G since the rotary cutting tool R is swingable to a position outside the guideway. Thus it can be readily seen that a 12 inch pipe can be cut with such a tool without the tool being of such dimensions as to be impractical. It will also be noted that the work supporting means is readily adjustable to support a workpiece substantially concentric with the opening in ring G.

It will of course be understood that various changes may be made in the form, details, arrangement and proportions of the various parts without departing from the scope of my invention.

What I claim is:

1. In a pipe cutter, the combination of a frame, a circular guideway carried by said frame adjacent one of its end portions and extending upwardly therefrom and having a central open area therewithin, a tool support movably mounted on said guideway for movement along the length thereof and being supported thereby, a rotary cutter tool pivotally mounted on said tool support and being swingable inwardly to a position to one side of and opposite the open area of said guideway and being rotatable in a plane normal to its axis of pivot, precision adjustable support mechanism mounted on said frame at the opposite side of the open area of said guideway, said support mechanism including a pair of support plates mounted upon opposite sides of said frame and slidable relative thereto in the plane in which said support plates extend, said support plates extending upwardly and inwardly toward each other and being movable upwardly and downwardly toward and away from each other in said plane, gear means mounted on said frame for controllably adjusting the relative positions of said support plates in said planes, said support plates carrying scale indicia adjacent said guideway indicating the proper position for said plates to accommodate a piece of pipe of known diameter thereupon, said support plates each having spaced and opposed supporting surfaces adapted to receive thereupon a piece of pipe of known diameter, said support plates being adjustable about an axis normal to their length and to said plane in order to support such a piece of pipe exactly normal to said cutter tool and parallel to the axis of rotation of said tool.

2. In a pipe cutter, the combination of a frame, a circular guideway carried by said frame adjacent one of its end portions and having a central open area therewithin, a tool support movably mounted on said guideway for movement therealong and being supported thereby, a rotary cutter tool pivotally mounted on said support and being pivotable inwardly to a position to one side of and opposite the open area of said guideway and being rotatable in a plane normal to its axis of pivot, a pair of support plates, means for slidably mounting said plates upon opposite sides of said frame so as to extend upwardly and inwardly toward each other and for movement in the plane in which they extend upwardly and downwardly toward and away from each other, each of said support plates having spaced and opposed elongated supporting surfaces adapted to receive a piece of pipe of known diameter thereupon, gear means mounted on said frame for controllably adjusting such movement of said support plates, and threaded mechanism interposed between said gear means and said plates adjacent one of their end portions for adjusting with precision said end portion of each of said plates relative to its other end portion whereby a piece of pipe of known diameter received upon said support plates may be adjusted with precision to support the same exactly normal to said cutter tool and parallel to its axis of rotation.

3. In a pipe cutter, the combination of a frame, a circular guideway carried by said frame and extending upwardly therefrom and having a central open area therewithin, a tool support movably mounted on said guideway for movement throughout the length thereof and being supported thereby, a rotary cutter tool pivotally mounted on said tool support and being pivotable inwardly to a position to one side of and opposite the open area of said guideway and being rotatable in a plane normal to its axis of pivot, a pair of elongated support plates mounted upon opposite sides of said frame for sliding movement relative thereto upwardly and inwardly toward each other, said support plates having spaced and opposed supporting surfaces adapted to receive a piece of pipe of known diameter thereupon, a journal fixedly secured to said frame adjacent each end of said support plates, a gear associated with each journal and rotatably mounted therein for simultaneous rotation with the gear at the other end of its respective support plate, a key mounted upon each end of said support plates opposite its respective gear and having teeth engaged by and driven by said gear, and screw means threaded into said key and engaged by its supporting plate for adjusting the key relative to its supporting plate at one end of said plate whereby said support surfaces may be adjusted with precision to support a piece of pipe thereupon exactly normal to said cutter tool and parallel to its axis of rotation.

4. In a pipe cutter, the combination of a frame adapted to be fixedly secured at its end portions to a support, a circular guideway carried by said frame at one of its end portions and having an open interior, a tool support revolvably mounted on said guideway for movement therearound and being supported thereby, a bracket mounted on said tool support and extending first outwardly therefrom and then parallel thereto, a pivot pin mounted on said tool support and movable therewith and extending outwardly therefrom through the portion of said bracket extending parallel to said support, a ring secured to said parallel portion of said bracket and receiving said pin therethrough, a plurality of screw members mounted in said ring and extending inwardly therefrom and engaging said pin to adjust the position of the same with precision relative to said tool support, a rotary cutter tool pivotally mounted on said pin and movable therewith and extending at an angle normal thereto, said rotary cutter tool being mounted on said pin and being pivotable inwardly to a position to one side and opposite the open interior of said guideway and being rotatable in a plane substantially parallel to the plane of its revolvement, and support mechanism adjustably mounted on said frame at the opposite side of the open interior of said guideway, said support mechanism being adapted to receive thereupon a piece of pipe of known diameter extending through the open interior of said guideway into the path of said rotary cutter tool and to be readily adjusted to support the same so as to extend exactly normal to said cutter tool as the latter rotates and cuts the same.

5. In a pipe cutter, the combination of a frame, a circular guideway carried by said frame adjacent one of its end portions and having a central open area therewithin, a tool support movably mounted on said guideway for movement around the circumference thereof and being supported thereby, a rotary cutter pivotally mounted on said tool support and pivotable inwardly to a position to one side of and opposite the open area of said guideway and extending normally to its axis of pivot, means carried by said tool support for fixedly securing said cutter tool against pivotal movement relative to said support, and precision adjustable support mechanism mounted on said frame at the opposite side of the open area of said guideway, said support mechanism having spaced and opposed supporting surfaces adapted to receive a piece of pipe of known diameter thereupon, said support mechanism also including means for adjusting said supporting surfaces about an axis transverse to their length to cause the same to support such a piece of pipe exactly normal to said cutter tool and parallel to the axis of rotation of said tool.

References Cited in the file of this patent

UNITED STATES PATENTS

| Number | Name | Date |
|---|---|---|
| 1,089,258 | Paterson | Mar. 3, 1914 |
| 1,717,345 | Ripley | June 11, 1929 |
| 1,780,288 | Yerk | Nov. 4, 1930 |
| 1,919,790 | Kottman | July 25, 1933 |
| 2,257,619 | Prill | Sept. 30, 1941 |
| 2,281,450 | Motch | Apr. 28, 1942 |
| 2,578,195 | Merrill | Dec. 11, 1951 |

FOREIGN PATENTS

| Number | Country | Date |
|---|---|---|
| 403,300 | Germany | Sept. 26, 1924 |